March 8, 1966     W. P. BIGLOW ETAL     3,238,641
DEMONSTRATION APPARATUS

Filed May 14, 1963     2 Sheets-Sheet 1

INVENTORS
WILLIAM P. BIGLOW
BY HARRIS VAN SOMEREN

ATTORNEYS

March 8, 1966 W. P. BIGLOW ETAL 3,238,641
DEMONSTRATION APPARATUS
Filed May 14, 1963 2 Sheets-Sheet 2
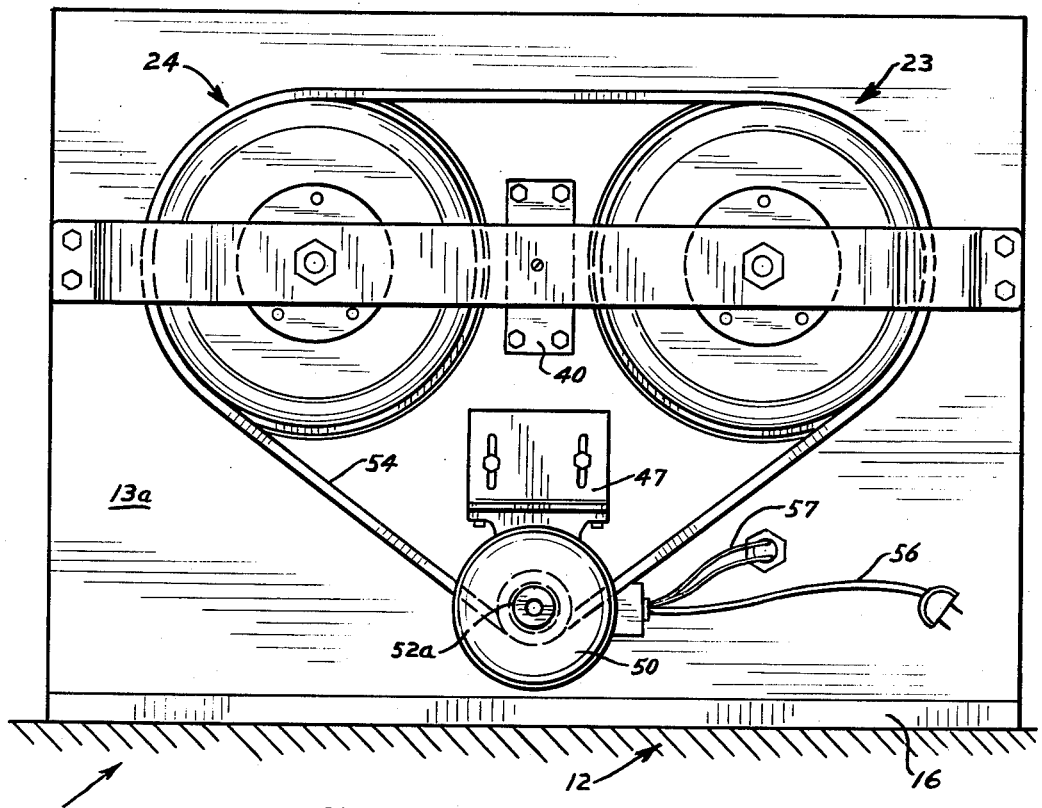
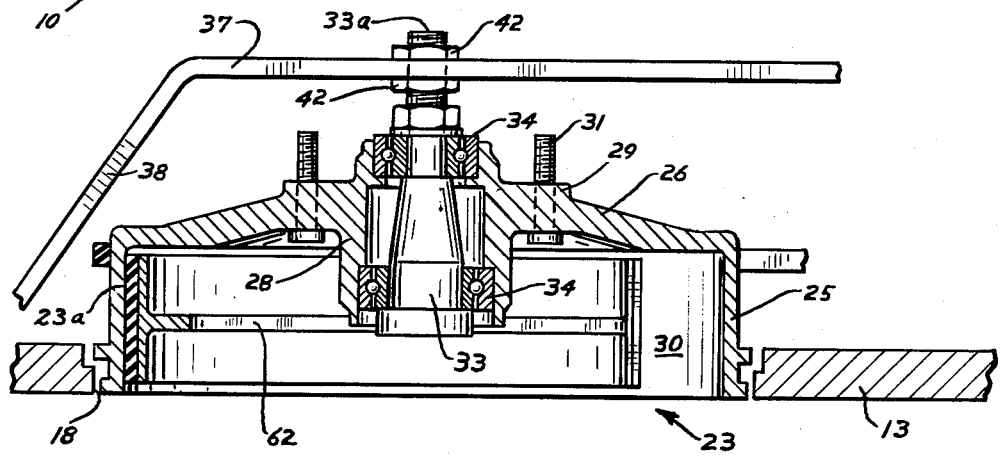
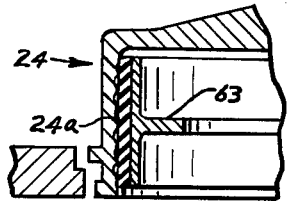
INVENTORS
WILLIAM P. BIGLOW
BY HARRIS VAN SOMEREN
ATTORNEYS

United States Patent Office 3,238,641
Patented Mar. 8, 1966

3,238,641
DEMONSTRATION APPARATUS
William P. Biglow and Harris Van Someren, Minneapolis, Minn., assignors to Star Machine & Tool Co., Minneapolis, Minn., a corporation of Minnesota
Filed May 14, 1963, Ser. No. 280,366
2 Claims. (Cl. 35—13)

This invention relates to a demonstration apparatus. More specifically the invention herein relates to automotive vehicles and more particularly it has to do with the operating relationship between relined brake shoes and their respective brake drums.

It is an object of the invention herein to provide a demonstration apparatus to indicate the difference in braking performance between a relined brake shoe and a turned brake drum as compared to a relined brake shoe with an unturned brake drum.

It is another object of this invention to provide an apparatus whereby through the operation of applicants' invention an operator may feel simultaneously the difference in the operating relationship between a relined brake shoe and a turned brake drum as compared to the relationship between a relined brake shoe and an unturned brake drum.

It is a further object of this invention to provide a mechanical demonstration operable by a spectator to indicate the desirability of having brake drums turned for use in connection with relined brake shoes.

It is also an object of this invention to provide a demonstration apparatus whereby a spectator operating the apparatus feels the difference between the use of a relined brake shoe with a turned brake drum as compared to the use of a relined brake shoe with an unturned brake drum.

These and other objects and advantages of the invention will be fully set forth in the following description made in connection with the accompanying drawings in which like reference characters refer to similar parts throughout the several views and in which:

FIG. 3 is a view of applicants' apparatus in rear elevation;

FIG. 4 is a broken view in substantially horizontal section on an enlarged scale taken on line 4—4 of FIG. 1 as indicated; and FIG. 5 is broken view in substantially vertical section on an enlarged scale taken on line 5—5 of FIG. 1 as indicated.

Figure 1:
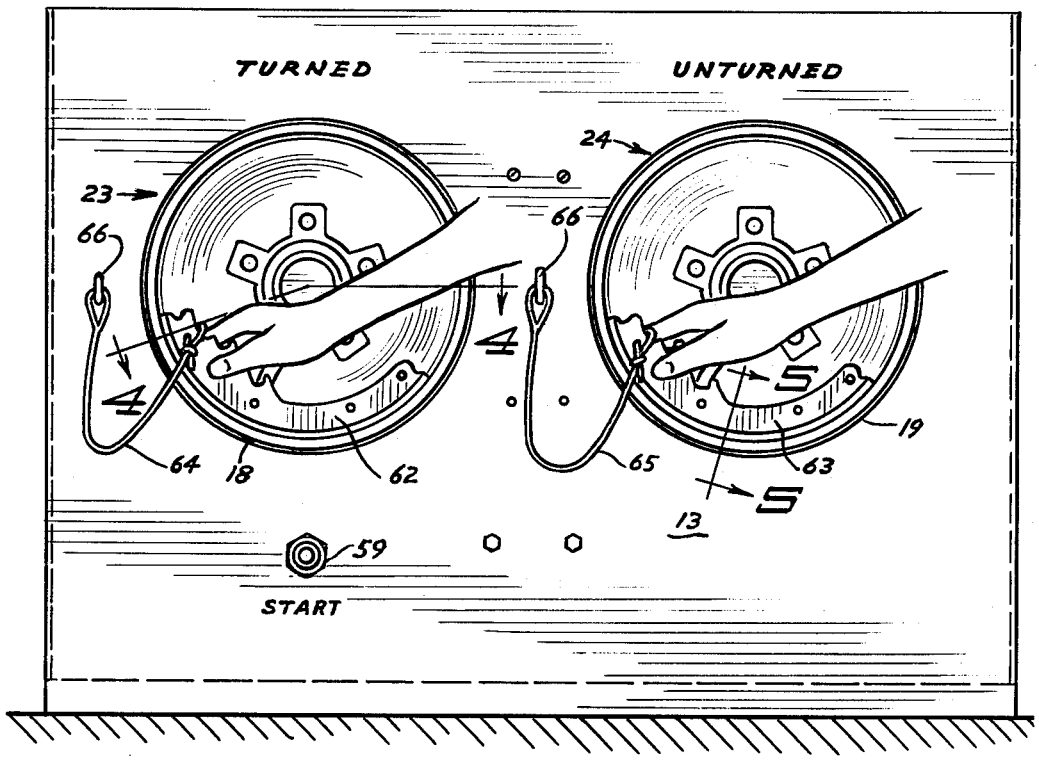
FIG. 1 is a view in front elevation showing applicants' apparatus in operating position.
Figure 2:
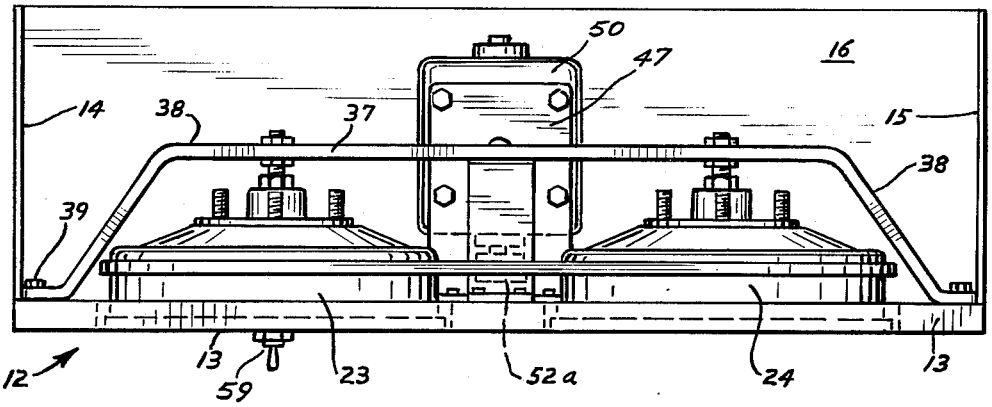
FIG. 2 is a top plan view of applicant's apparatus.

With reference to the drawings, the applicants' demonstration apparatus is indicated generally by the character 10. The housing and other structural details of applicants' apparatus may take various forms. In the preferred embodiment here presented, applicants' invention comprises a display housing 12 substantially parallelepiped in form having a forward or front wall 13 and side walls 14 and 15, all upstanding from a base portion 16. The rear or inner side of said front wall 13 is indicated by the character 13a. Although not here so shown, the apparatus may be completely enclosed.

Formed in said front wall 13 are spaced openings 18 and 19 in horizontal alignment and being of a size to receive therein brake drums 23 and 24. Said brake drums are of conventional design and are of the kind commonly used in automotive vehicles, either passenger or commercial vehicles. With an exception hereafter to be noted, said brake drums are of identical construction and are identically mounted whereby only brake drum 23 will be described in detail. Brake drum 24 will have corresponding parts.

Said brake drum 23 comprises an annular rim portion 25 extending forwardly of a rear wall or web portion 26 having axially thereof a hub portion 28 having formed immediately thereabout a substantially flat flange portion 29 having extending therethrough wheel bolts 31. Formed within said rim portion is a chamber 30.

Journaled within said hub 28 by means of a conventional bearing rings 34 is a spindle 33 having a rearwardly extending portion 33a of reduced diameter.

As illustrated, said brake drums 23 and 24 have their respective rim portions supported within said openings 18 and 19 and extend rearwardly of said front wall 13 having their respective extended spindle portions journaled in a supporting member 37 comprising an elongated relatively narrow plate-like member spaced rearwardly of said front wall and extending longitudinally thereof. Said supporting member has angled arm portions 38 at either end thereof extending to said front wall to be secured thereto by bolts 39. A bracket 40 carried by said front wall provides a central support for said member 37. Said spindle portions journaled in said member 37 are secured in position by lock nuts 42, as illustrated in FIG. 4.

Carried by a bracket 47 adjustably secured to said front wall 13 is a suitable electric motor 50 having a pulley or drive shaft 52a. Said motor will be positioned to have its pulley in an operative relationship with said drums 23 and 24. Passing over said drums and said pulley is a drive belt 54 of suitable design. Although not here shown, said drums may be provided with annular external grooves to receive said belt. Said motor 50 has a line 56 equipped with a plug to be connected to a convenient power source, such as by connection with a wall receptacle and a second line 57 runs from said motor to a toggle switch 59 mounted on the front surface of said wall 13.

When drum surface is mentioned hereinafter, it will have specific reference to the inner surfaces of said rim portions 23 and 24 as respectively indicated by the characters 23a and 24a.

The drum surface 23a is turned and this presents a smooth surface. The drum surface 24a has not been turned and an irregular surface is present, as indicated on a magnified scale by said character 24a in FIG. 5. It will be understood that said brake drums have been used with an original set of brake shoes and that the original brake shoes require relining. Hence the brake drums have been worn. The worn drum surface of the brake drum 23 has been turned. The worn drum surface of the brake drum 24 has not been turned and is in the condition resulting from the wear of the original set of brake shoes used in connection therewith.

With reference to FIG. 1, brake shoes 62 and 63 are shown and these will be understood to represent relined brake shoes. Said brakes shoes are shown in operating position, and shown respectively secured thereto and fastening the same to eyelet bolts 66 carried by said front wall 13 are fastening means 64 and 65 here shown in the form of lanyards.

OPERATION

Applicants' apparatus will be set up as a demonstration display to be operated by spectators as an educational device to demonstrate by physical touch the difference which is present in the operative relationship between a relined brake shoe and a turned drum compared to the relationship between a relined brake shoe and a drum which has not been turned.

When not in operating position, the brake shoes 62 and 63 will be held in suspended position by the lanyards 64 and 65.

To operate the apparatus, as indicated in FIG. 1, a spectator will turn the switch 59 to an On position to energize the motor 50, and said motor by means of the belt 54 will rotate the drums 23 and 24. The spectator will now take brake shoe 62 in hand and place it in operating position within the drum 23 to engage the drum surface 23a thereof. There will result a smooth gripping action between the brake shoe and the drum surface 23a which will be felt.

Next, the spectator will take the brake shoe 63 in hand and position the same within the brake drum 24 to engage the drum surface 24a which has not been turned. An irregular rough engagement will be felt. This is contrasted to the smooth gripping action resulting from the engagement of the brake shoe 62 with the turned drum surface 23a.

An even more dramatic contrast is experienced when the spectator takes a brake shoe in each hand and simultaneously positions the brake shoes to engage their respective brake drum surfaces and directly experiences the difference between the smooth engagement between the brake shoe 62 and the turned brake drum surface 23a compared to the rough engagement between the brake shoe 63 and the unturned brake drum surface 24a.

The applicants' apparatus has proved to be very successful in operation and provides a simple and dramatically effective demonstration.

It will of course be understood that various changes may be made in the form, details, arrangement and proportions of the parts, without departing from the scope of applicants' invention which, generally stated, consists in an apparatus capable of carrying out the objects above set forth, in the parts and combinations of parts disclosed and defined in the appended claims.

What is claimed is:

1. A demonstration apparatus of the type indicated having in combination,
   a display housing comprising a front wall, said front wall having a pair of spaced apertures therein,
   a pair of brake drums respectively disposed within said apertures to be displayed therein, one of said brake drums being turned and the other of said brake drums not being turned,
   a bracket carried by said housing rotatively supporting said brake drums,
   means in connection with said housing rotating said brake drums, and
   a brake shoe, means securing said brake shoe to said front wall for operative association with said brake drums.

2. A demonstration apparatus of the type indicated having in combination,
   an upstanding display housing having an outwardly facing supporting plate member,
   a pair of brake drums, one of said brake drums being turned and the other of said brake drums not being turned,
   said plate member having spaced apertures to receive and display said brake drums,
   bracket means in connection with said housing rotatably supporting said brake drums,
   means rotating said brake drums,
   a pair of brake shoes, means separately supporting said brake shoes on said plate member for operative association with said brake drums, and
   said brake drums being designed and arranged to receive said brake shoes for operative engagement therewith.

References Cited by the Examiner

UNITED STATES PATENTS

| | | | |
|---|---|---|---|
| 1,964,163 | 6/1934 | La Brie | 188—78 |
| 3,016,112 | 1/1962 | Helvern | 188—78 |
| 3,021,923 | 2/1962 | Burnett | 188—78 |

EUGENE R. CAPOZIO, *Primary Examiner.*

SHELDON M. BENDER, *Assistant Examiner.*